Sept. 5, 1967  F. E. HOLLADAY  3,339,681
SOLENOID ACTUATED ONE WAY BRAKE
Filed May 23, 1966
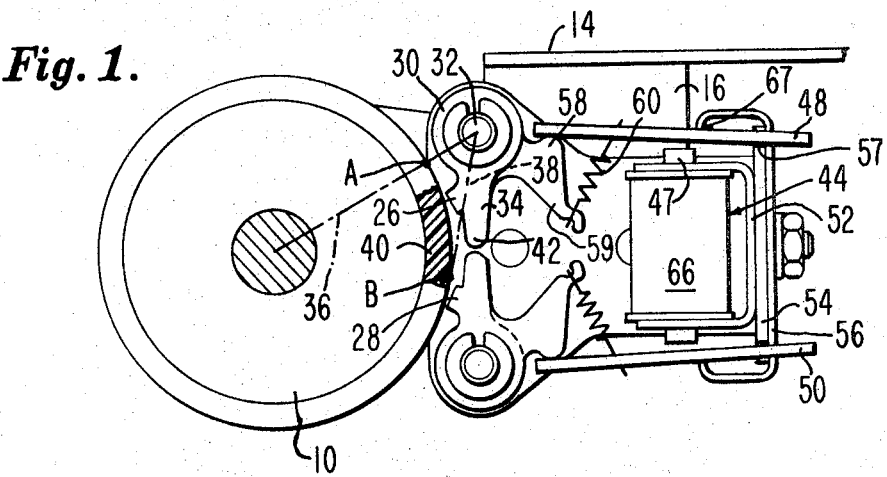
Fig. 1.
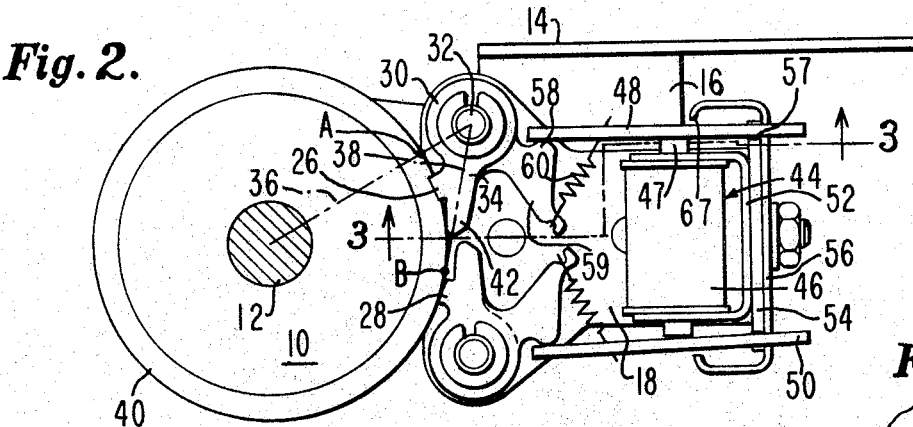
Fig. 2.
Fig. 4.
Fig. 3.
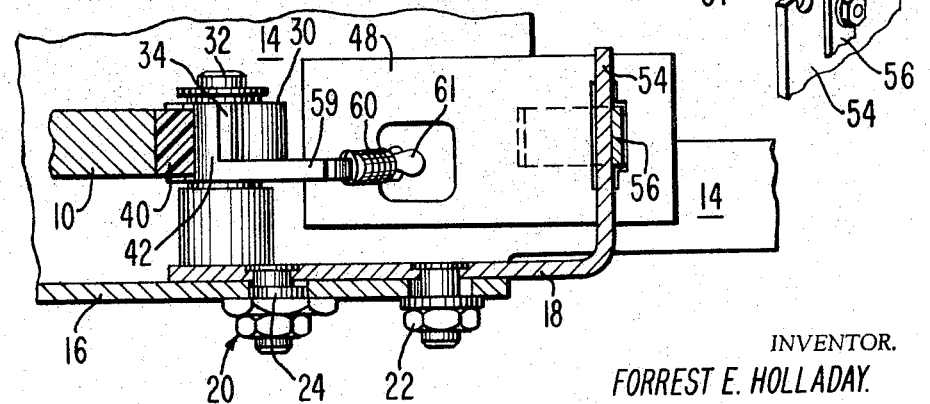
INVENTOR.
FORREST E. HOLLADAY.
BY
*Wallace R. Lamb*
ATTORNEY.

United States Patent Office 3,339,681
Patented Sept. 5, 1967

3,339,681
SOLENOID ACTUATED ONE WAY BRAKE
Forrest E. Holladay, Plymouth, Mich., assignor to Burroughs Corporation, Detroit, Mich., a corporation of Michigan
Filed May 23, 1966, Ser. No. 552,184
5 Claims. (Cl. 188—163)

This invention relates generally to an electrically operated brake for stopping a driven shaft.

It is the principal object of the invention to provide a brake of a character for instantly stopping a driven shaft so as to avoid overtravel of the shaft.

Another object of the invention is to provide an improved brake mechanism including a brake drum and a pivotal stop member of a structural character such that the torque of the rotating drum forces the stop member further against the drum in a jamming action following movement of the stop member into contact with the drum periphery.

In connection with the next preceding object, it is a more specific object if the invention to provide a brake mechanism in which the torque of a rotating brake drum is applied as the braking force so that the stop member may be pivoted by a low powered element or solenoid to the position where the drum torque is effective to draw the stop member further into a displaceable drum periphery.

A further object of the invention resides in the provision of a restraining member which is pivoted into contact with the drum periphery to limit rotation of the stop member by the drum.

A still further object of the invention resides in the provision of a brake mechanism which is effective only in connection with the rotation of a brake drum in one direction.

Other objects of the invention will become apparent from the following description, taken in connection with the accompanying drawing in which:

FIG. 1 is an end view partly broken away and in section of a brake mechanism embodying features of the invention;

FIG. 2 is a view similar to FIG. 1 showing the brake applied;

FIG. 3 is a horizontal sectional view, taken along the line 3—3 of FIG. 1, and

FIG. 4 is a fragmentary perspective view, partly broken away and in section.

Referring to the drawings by characters of reference, the brake mechanism includes a brake drum 10 affixed onto a rotatable driven shaft 12 which may be mounted in suitable journals (not shown). A frame or supporting member 14 is positioned laterally of the axis or shaft 12 and has an upright flange 16 supporting a mounting or base plate 18. The base plate 18 is fastened to the flange 16 by horizontally spaced screws and nuts 20 and 22 and on the shank of one of the screws there is a disc shaped eccentric 24. The eccentric 24 engages in an aperture in the base plate 18 and is rotatable for horizontal adjustment of the position of the base plate with respect to the periphery of the drum 10.

Mounted on the base plate 18 there is a pair of stop members or brake shoes 26 and 28 positioned adjacent the periphery of the drum 10 and respectively above and below the axis of rotation of the drum, was viewed in FIGS. 1 and 2. The shoe 26 is effective to stop the drum 10 when the latter is rotating in a counterclockwise direction, and has a hub 30 which is pivoted on a stub shaft 32, affixed at one end thereof to the adjustable base plate 18. An arm 34, integral with the hub 30 extends from the axis of the stub shaft 32 in a direction counter to the direction of rotation of the drum 10, and formed on the arm 34, in overlying relation to the drum periphery, is the brake shoe 26. In order to utilize the torque of the rotating brake drum 10 as the braking force therefor, the shoe 26 is located to engage the drum periphery between points A and B on the drum periphery. As shown, point A is the point of intersection of a plane 36 passing through the parallel axes of the drum shaft 12 and the shoe pivot, and the point B is the point of tangency with the drum periphery of a plane 38 extending from the shoe pivot in a direction counter to the direction of rotation of the drum 10. It will thus be seen that the torque of the drum 10, rotating in a counterclockwise direction, tends to pivot the shoe in a clockwise direction which pulls the shoe into the drum periphery to stop the drum. Preferably, the drum 10 is provided with a rim 40 of a suitably displaceable resilient plastic material, such as neoprene, to effect a jamming of the shoe 26 and the rim with accompanying instant stopping of the drum upon application of the brake shoe 26. The rim 40 may be cemented or be otherwise suitably bonded to the drum proper. To prevent displacement of the plastic rim 40 by the shoe 26 to the extent where breakage of the shoe may occur or where release of the brake may be difficult, I provide a restraining member 42 to limit displacement of the drum rim 40 by the shoe 26. To this end, the restraining member 42 is an extension of the arm 34 which in its effective position of FIG. 2, lies in the plane 38 that extends through the tangency point B of the periphery of rim 40. As shown, the rounded end of the restraining arm 42 is positioned to engage and ride on the drum rim 40 at a point between the brake shoe 26 and the tangent point B and, as previously mentioned, limits the depth to which the torque of the drum may draw the shoe into the resilient drum rim. The brake shoe 26 is also made of a resilient plastic material, the material preferably being Adaprene having a hardness or displacement characteristic greater than the hardness or displacement characteristic of the neoprene drum rim 40. For example, for satisfactory results the drum rim 40 may have a durometer reading of 55 to 65, whereas the brake shoe 26 may have a durometer reading of 80 to 100.

To initiate a braking action, a power element or solenoid 44 is provided and is suitably mounted on the adjustable base plate 18. The solenoid comprises the usual coil 46, a core 47 and a pair of electrically operated actuators or clappers 48 and 50. As shown, the opposite ends of the solenoid core 47 are bridged by a bracket 52 which functions as a flux path and also functions to mount the solenoid 44 on a flange 54 of the base plate 18. Also attached to the base plate flange 54 there is a bracket 56 on which the clappers 48 and 50 are fulcrummed, as at 57, in the well known manner. Integral with the brake shoe hub 30 there is a relatively short lever arm 58 and a relatively long lever arm 59, the arms being adjacent and inwardly of the solenoid clapper 48. The end of the relatively short arm 58 is rounded and abuts the inner face of the clapper 48 adjacent the free end of the latter and is held in engagement therewith by a tensioned coil spring 60. One end of the spring is connected to the relatively long arm 59 and the other end of the spring is attached to a tab 61 formed out of the clapper 48 at a point between the clapper fulcrum 57 and the rounded end of the lever 58. The relatively short arm 58 of the drum shoe 56, the clapper 48 and the spring 60 constitute a form of toggle device wherein a component of the force of spring 60 tends to move the shoe 26 away from the drum rim 40 and the clapper 48 away from the solenoid core 47, limited by a stop member 67. When the solenoid 44 is energized, the clapper 48 is pulled to the core 47 and pivots the brake shoe 26 into biting engagement with the drum rim 40 to effect the braking action. Also, the brake supplying action further tensions the spring 60 by reason of the spring being attached to the relatively long arm 42 so that when the solenoid is again deenergized, the above mentioned component of the spring force will function as an overcenter type of action to restore the brake shoe 26 and the clapper 48 to their normal positions shown in FIG. 1.

The other brake shoe 28 is similar to the brake shoe 26 and both shoes are moved into engagement with the drum periphery by and upon energization of the solenoid 44. However, only one of the shoes is effective, depending upon the direction of rotation of the drum 10. For example, when the drum 10 is rotating in a counterclockwise direction, the shoe 26 will be pulled in and be jammed against the drum by the torque of the latter, and the other shoe 28 will be thrust away from and by rotation of the drum. When the drum 10 is rotating clockwise and the solenoid 44 is energized, only by the shoe 28 can be drawn into effective braking action with the drum rim.

From the above description, it will now be understood that the power of the solenoid 44 is not employed as the braking force, but instead functions to move the brake shoe into contact with the resilient drum rim 40 to the point where the torque of the drum applies the brake by a jamming action between the rim and the brake shoe.

I claim:

1. A brake mechanism comprising a rotatable brake drum having a resilient periphery, supporting means, a brake shoe pivoted on said supporting means outwardly of the periphery of said drum with the axis of rotation of said drum and shoe substantially in parallel relationship, said shoe positioned laterally of its axis in a direction counter to the direction of rotation of said drum to engage said drum periphery between said axis and a point of tangency with said drum periphery of a plane passing through said axis, a power element operatively connected to said shoe and operable to pivot the latter into engagement with said drum periphery, and a restraining member pivotal with said shoe into engagement with the periphery of said drum to restrain rotation of said shoe by said drum.

2. A brake mechanism as defined by claim 1 wherein said restraining member is a pivotal arm engageable with the periphery of said drum on the other side of said shoe from said pivot.

3. A brake mechanism as defined by claim 1 wherein said shoe is closer to said axis than to said point of tangency.

4. A brake mechanism as defined by claim 1 wherein said shoe and said arm pivot together and extend from said axis in a direction counter to the direction of rotation of said drum and with said shoe carried by said arm.

5. A brake mechanism as defined by claim 1 wherein said power element is an electrically operated element abutting an arm of said shoe and operable to move the latter into biting relation with the resilient periphery of said drum, and a return spring urging said shoe away from the periphery of said drum and holding said arm and said electrically operated element in abutting relationship.

References Cited

UNITED STATES PATENTS 3,281,043   10/1966   Plumb _____ 188—82.7 X

DUANE A. REGER, *Primary Examiner.*